(12) United States Patent
Bergeron

(10) Patent No.: US 8,734,012 B2
(45) Date of Patent: May 27, 2014

(54) TEMPERATURE SENSOR

(75) Inventor: Gary D. Bergeron, Muskegon, MI (US)

(73) Assignee: Therm-O-Disc, Incorporated, Mansfield, OH (US)

( * ) Notice: Subject to any disclaimer, the term of this patent is extended or adjusted under 35 U.S.C. 154(b) by 623 days.

(21) Appl. No.: 12/861,397

(22) Filed: Aug. 23, 2010

(65) Prior Publication Data

US 2011/0044374 A1  Feb. 24, 2011

Related U.S. Application Data

(60) Provisional application No. 61/274,844, filed on Aug. 21, 2009.

(51) Int. Cl.
*G01K 1/08* (2006.01)
*G01K 7/00* (2006.01)

(52) U.S. Cl.
USPC .................. 374/208; 374/148; 374/183

(58) Field of Classification Search
USPC .................. 374/208, 148, 183
See application file for complete search history.

(56) References Cited

U.S. PATENT DOCUMENTS

| | | | |
|---|---|---|---|
| 4,420,738 A * | 12/1983 | Rehmann et al. | 338/28 |
| 4,538,927 A * | 9/1985 | Jochemczyk et al. | 374/163 |
| 4,603,026 A * | 7/1986 | Martin | 264/272.18 |
| 4,866,410 A * | 9/1989 | Deppe et al. | 338/28 |
| 5,302,934 A * | 4/1994 | Hart et al. | 338/22 R |
| 5,427,452 A * | 6/1995 | Stuart | 374/179 |
| 5,720,556 A * | 2/1998 | Krellner | 374/185 |
| 6,338,571 B1 * | 1/2002 | Chen | 374/208 |
| 6,588,931 B2 * | 7/2003 | Betzner et al. | 374/185 |
| 6,676,290 B1 * | 1/2004 | Lu | 374/163 |
| 7,201,513 B2 * | 4/2007 | Nakabayashi | 374/208 |
| 7,553,079 B1 * | 6/2009 | Khan et al. | 374/208 |
| 2002/0006155 A1 * | 1/2002 | Wienand et al. | 374/185 |
| 2004/0101031 A1 * | 5/2004 | Kotwicki | 374/185 |
| 2005/0092460 A1 * | 5/2005 | Darby | 165/11.1 |
| 2006/0215731 A1 * | 9/2006 | Gadonniex et al. | 374/208 |
| 2007/0140312 A1 * | 6/2007 | Seo et al. | 374/145 |
| 2009/0168839 A1 * | 7/2009 | Park | 374/165 |
| 2010/0014557 A1 * | 1/2010 | Tomioka et al. | 374/163 |
| 2010/0282163 A1 * | 11/2010 | Aggarwal et al. | 118/666 |

* cited by examiner

*Primary Examiner* — Mirellys Jagan
(74) *Attorney, Agent, or Firm* — Harness, Dickey & Pierce, P.L.C.

(57) ABSTRACT

A temperature sensor includes a plastic bottom shell, a plastic cap mating the plastic shell, and a temperature responsive element mounted to the plastic cap and received in a cavity of the plastic bottom shell. The temperature responsive element is positioned in the plastic bottom shell by the cap. An insulating coating is applied to the temperature responsive element. The insulating coating and the plastic bottom shell provide dual electrical insulation for the temperature responsive element.

16 Claims, 4 Drawing Sheets

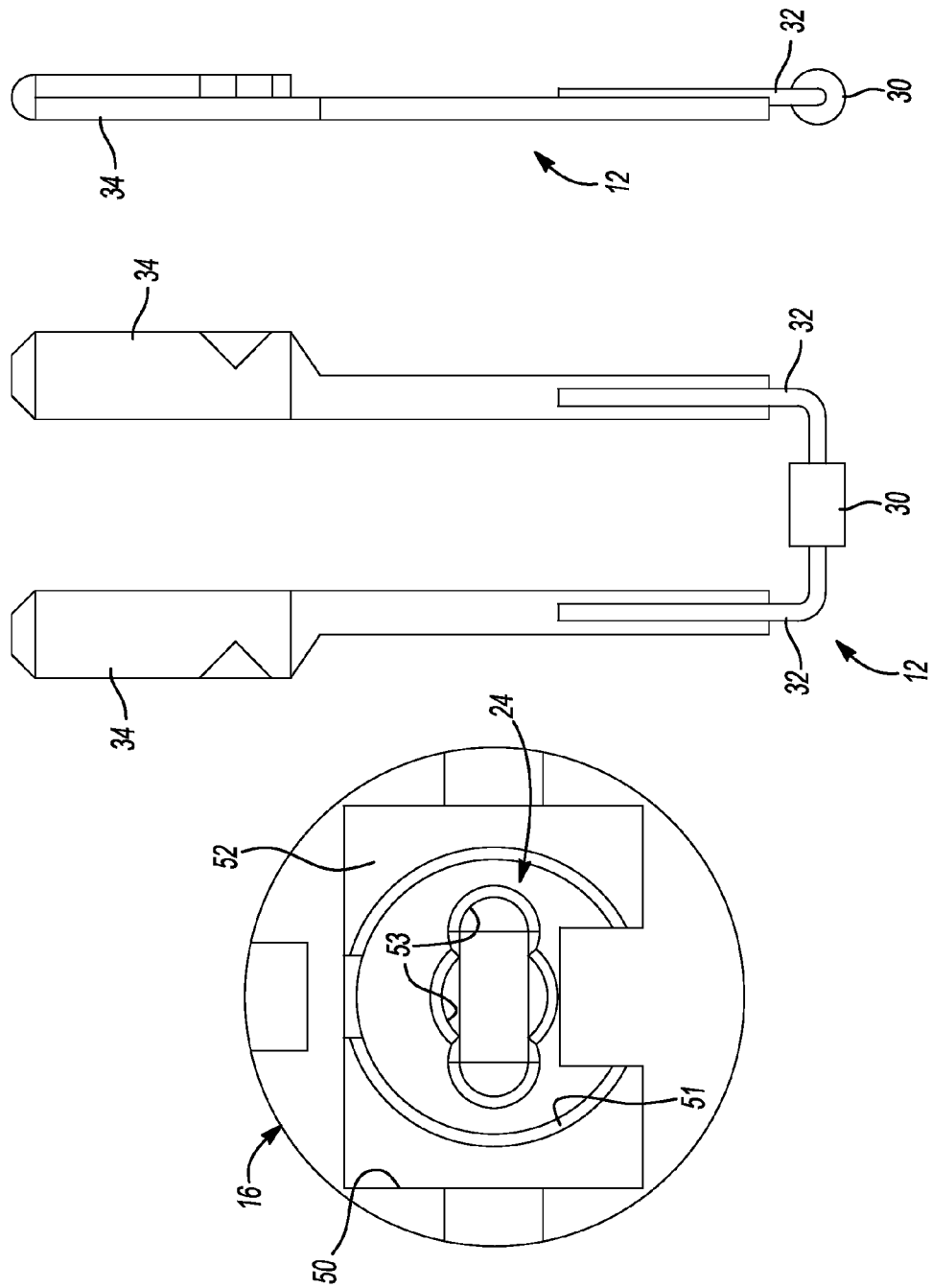

US 8,734,012 B2

TEMPERATURE SENSOR

CROSS-REFERENCE TO RELATED APPLICATIONS

This application claims the benefit of U.S. Provisional Application No. 61/274,844 filed on Aug. 21, 2009. The entire disclosure of the above application is incorporated herein by reference.

FIELD

The present disclosure relates to a temperature sensor, and particularly to a temperature sensor for use in household appliance applications.

BACKGROUND

This section provides background information related to the present disclosure which is not necessarily prior art.

A temperature sensors for household appliance applications are typically required to meet certain industry safety standards, such as the IEC 60335-1 safety of electrical household appliances standard.

Generally speaking, such temperature sensors include a dielectric housing and a temperature responsive element that is received in the housing. In order to meet industry-accepted standards for such a construction, the housing must have a minimum wall thickness of at least 2 mm around the temperature responsive element and all components that can or will come in contact with the sensing medium. This construction requires increased material costs and slows down the thermal time constant for the temperature sensor.

Alternatively, to meet industry-accepted standards, a "dual insulation" construction can be used. In such a configuration, in addition to a dielectric housing, which may have a wall thickness of only 1 mm, a second and separate insulative coating of any thickness is applied to the temperature responsive element and all components that can or will come in contact with the sensing medium before they are assembled into the housing. Such a construction, however, requires time consuming and costly manufacturing operations of pre-coating and curing the temperature responsive element and other components with the secondary insulator.

SUMMARY

This section provides a general summary of the disclosure, and is not a comprehensive disclosure of its full scope or all of its features.

The temperature sensor of the present disclosure includes a two-piece housing structure and a temperature responsive element received inside the two-piece housing structure. The two-piece housing structure includes a bottom shell and a top connector, both made from a dielectric material, such as plastic. The bottom shell has a uniform wall thickness of 1 mm, particularly in areas where there are components that can or will come in contact with the sensing medium. Conducting portions of the temperature responsive element are covered by an epoxy.

To assemble the temperature sensor, the temperature responsive element is mounted to the connector to form a subassembly. Epoxy is injected into a cavity of the bottom shell. Before the epoxy is cured, the subassembly is inserted into the cavity of the bottom shell. The bottom shell and the connector have mating structures that guide and locate the temperature responsive element within the cavity. The temperature responsive element is centered in the cavity, positioned an equal distance from the walls of the bottom shell so that the epoxy fills the space between the temperature responsive element and the cavity walls. The temperature sensor of the present disclosure achieves the IEC 60335-1 safety of electrical household appliances standard, Class II insulation requirements, maintains a fast thermal time constant, and can be easily manufactured consistently in a high-volume production environment.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a top view a bottom shell portion for the temperature sensor according to the present disclosure;

FIG. 4 is a front view of a temperature responsive element for the temperature sensor according to the present disclosure;

FIG. 5 is a side view of the temperature responsive element of FIG. 4;

Corresponding reference numerals indicate corresponding parts throughout the several views of the drawings.

DETAILED DESCRIPTION

Example embodiments will now be described more fully with reference to the accompanying drawings.

Figure 6:
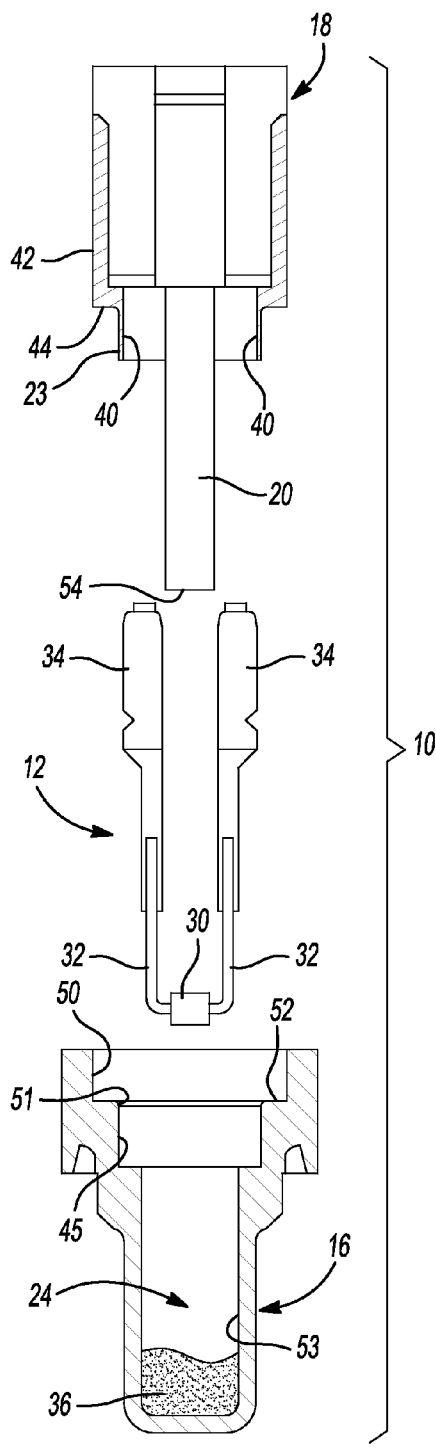
FIG. 6 is an exploded front view, in partial cross-section, of a temperature sensor according to the present disclosure.
Figure 7:
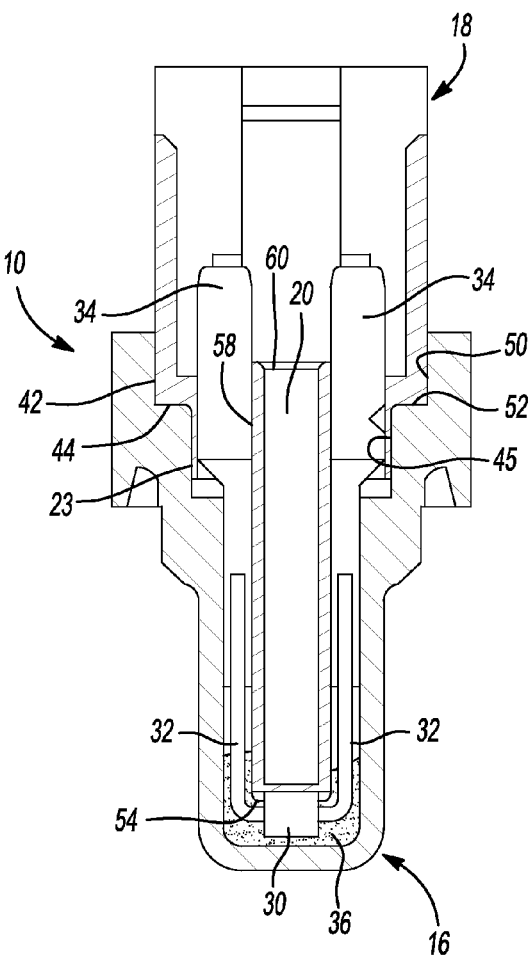
FIG. 7 is a cross-sectional front view of an assembled temperature sensor according to the present disclosure.

Referring generally to FIGS. 1 to 7, a temperature sensor 10 according to the present disclosure is shown. The temperature sensor 10 is an assembly that generally has a two piece housing 14 including a top connector 18 and a bottom shell 16. A terminal subassembly 12 including a temperature responsive element, such as temperature sensitive thermistor 30 is contained and particularly located within the housing 14. As best seen in FIG. 7, a dielectric material 36, such as epoxy, fills a portion of the bottom shell 16 and surrounds the thermistor 30. Design features included in the top connector 18 and bottom shell 16 facilitate the orientation and positioning of the terminal subassembly 12 (and hence, the thermistor 30) in the temperature sensor 10 in a manner that is repeatable with the consistency necessary for manufacture of the temperature sensor 10 in a high-volume production environment with acceptable scrap rates.

As shown in FIGS. 1, 2, 6 and 7, the top connector 18 of the housing 14 includes a terminal connector portion 38 at its upper end, and an extension portion 20, such as a post, at its lower end. Intermediate the connector portion 38 and the extension portion 20 is a cylindrical portion 23. The extension portion 20 projects away from the connector portion 38. A pair of slots 40 are included at the lower end of the cap portion 18 at locations that are adjacent to the extension portion 20.

An outer wall 42 of the terminal connector portion 38 of the top connector 18 forms a shoulder 44 that is adjacent to the slots 40.

At FIGS. 1-3 and 6-7, the bottom shell 16 of the housing 14 includes an upper surface 46 on which are located a plurality projections 48 extending upwardly from the upper surface 46. A first aperture 50 in the upper surface 46 of the bottom shell 16 opens to a ledge portion 52. The ledge portion 52 has a second aperture 51 that opens to an inner surface 45. Further into the interior of the bottom shell 16 is a cavity 24 defined by inner walls 53 in the bottom shell 16 within which the terminal subassembly 12 is contained in bottom shell 16 when the temperature sensor 10 is fully assembled. The wall thickness for the portion of the bottom shell 16 that surrounds the cavity 24 generally exhibits a uniform, thin-walled structure having a thickness of approximately 1 mm.

The top connector portion 18 and the bottom shell 16 are each made from a dielectric material, which can include a variety of plastic materials. A preferred plastic material from which the bottom shell 16 and the top connector 18 may be made is polypropylene. Both the top connector portion 18 and the bottom shell 16 can be molded components, and manufactured with closely held tolerances.

Figure 1:
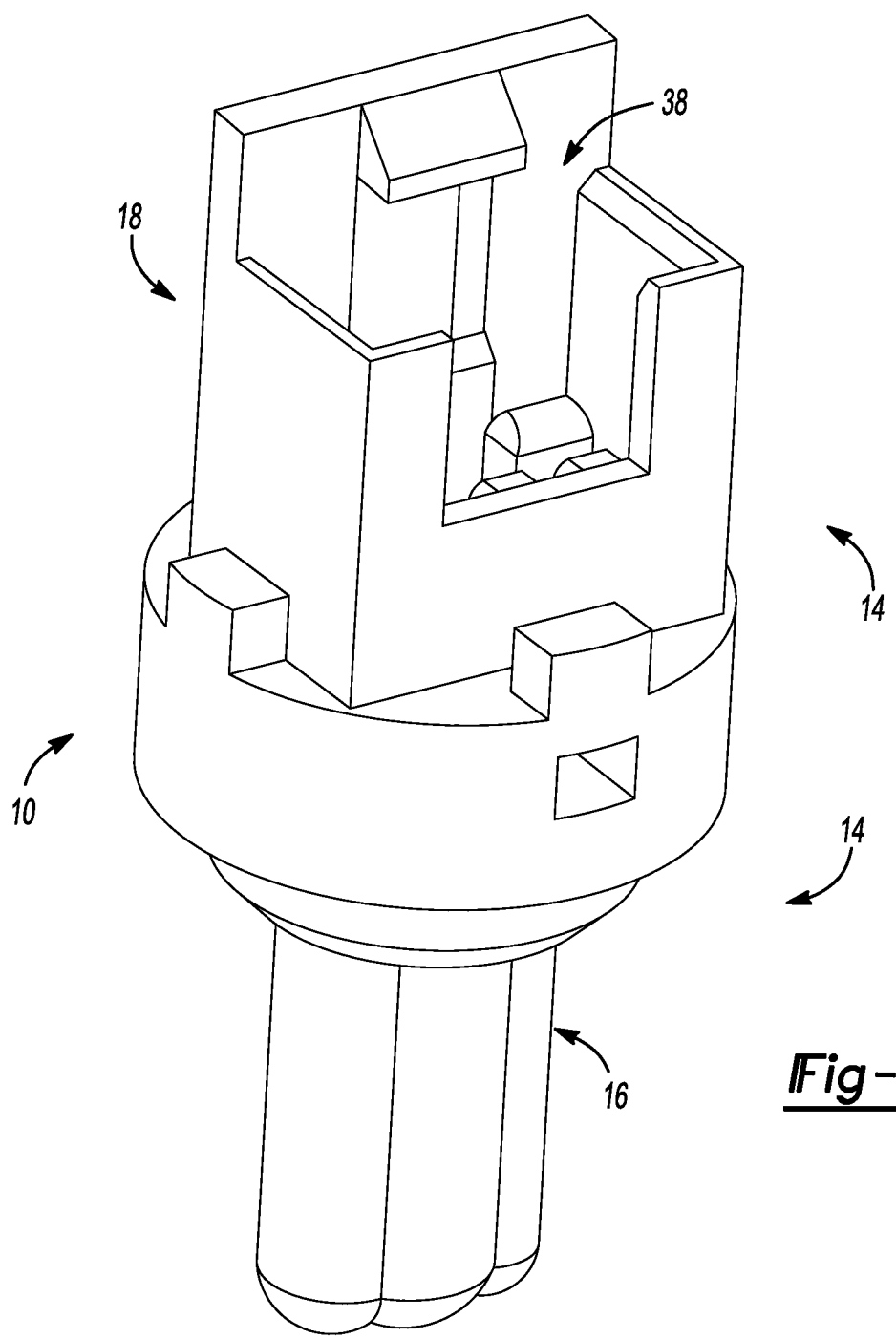
FIG. 1 is front isometric view of a temperature sensor according to the present disclosure.
Figure 2:
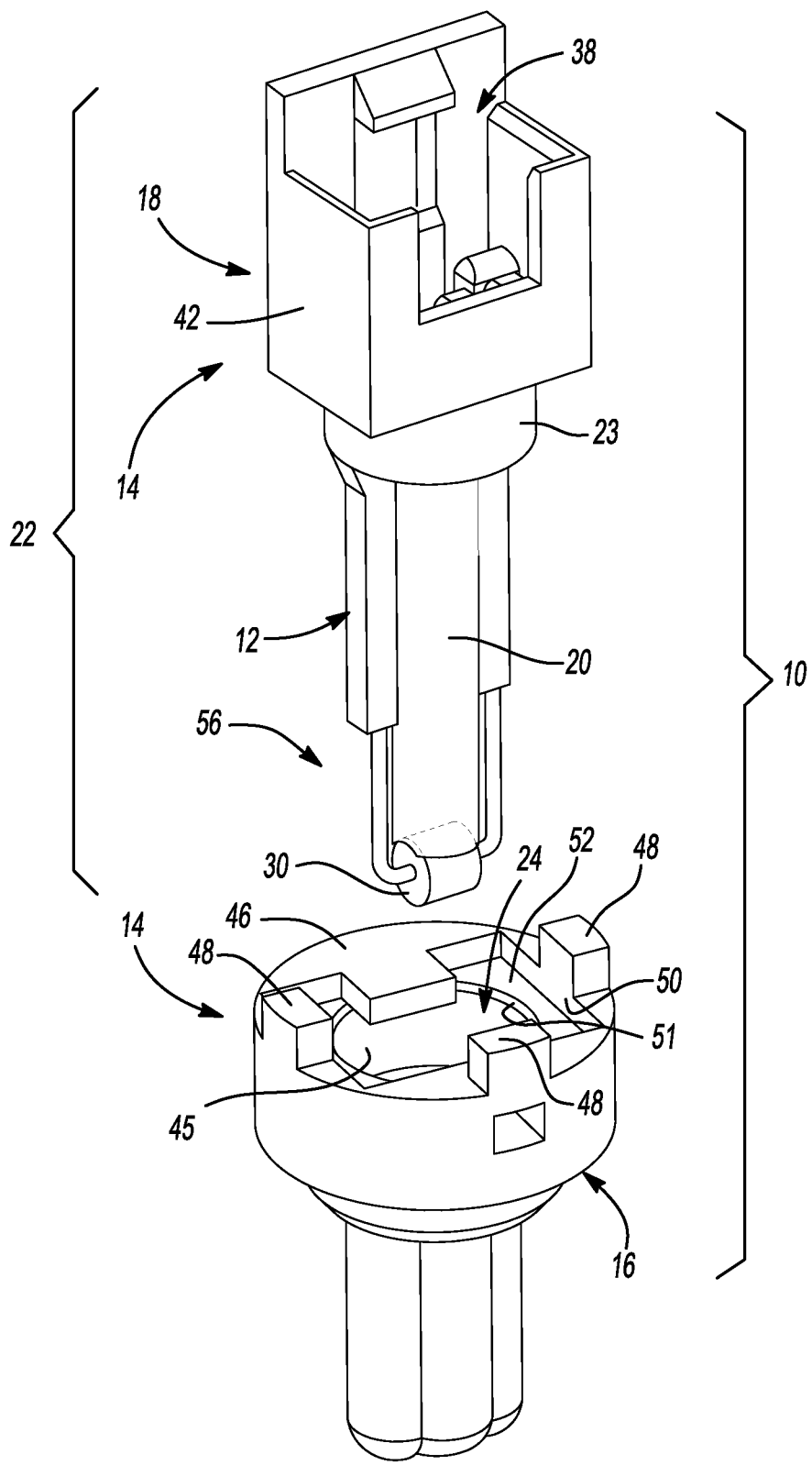
FIG. 2 is a partially-exploded isometric view of the temperature sensor shown in FIG. 1.

Referring now to FIGS. 2, 4 and 5, the terminal subassembly 12 is shown and includes a temperature responsive element, such as a thermistor component 30. A pair of current conducting terminals 34 are electrically connected to the temperature responsive element 30 being joined at current conducting leads 32 located on opposite sides of the temperature responsive element 30. The terminals 34 can be joined to the leads 32, for example, by soldering or any other suitable means. A suitable thermally sensitive resistor that exhibits a change in electrical resistance with a change in its temperature and is suitable for use in the temperature sensor 10 may be obtained from Therm-O-Disc, Incorporated of Mansfield, Ohio. Of course, determining a particular thermistor that is best suited for a given application ultimately depends on the temperature sensor's anticipated use.

The assembly of the temperature sensor 10 is understood with reference to FIGS. 2, 6 and 7. FIG. 2 shows a partially exploded isometric view of the temperature sensor 10. As illustrated, the terminal subassembly 12 is pre-assembled to the top connector 18 to form a subassembly 22. Subassembly 22 is assembled by inserting the terminals 34 of the terminal subassembly 12 into the slots 40 of the top connector 18. The sizing of the terminals 34 and the slots 40 can be such that the terminals 34 are received in the slots 40 with a slight interference fit. The terminals 34 are inserted into the slots 40 until the temperature responsive element (e.g., thermistor 30) of the terminal subassembly 12 abuts the distal end 54 of the extension portion 20 of the top connector 18, as shown in FIGS. 2 and 7. More specifically, as best seen in FIG. 2, the distal end 54 of the extension portion 20 is formed to match the shape of the temperature responsive element 30 to ensure a close fit between the components and to assist in locating the temperature responsive element 30 relative to the extension portion 20. When the top connector 18 and the terminal subassembly 12 are fully assembled, the temperature responsive element 30 is specifically located relative to the features of the top connector 18, including the shoulder 44 and cylinder portion 23.

The bottom shell 16 is then prepared for joining to the subassembly 22. As best seen in FIG. 6, a dielectric material 36 is disposed in the cavity 24 of the bottom shell 16. The dielectric material 36 may take the form of a curable, viscous liquid material. The dielectric material 36 may include, for example, a thermally conductive base plastic material, such as epoxy, that is enhanced with additives. The additives may be electrically isolative and yet have better thermally conductive properties than those of the base plastic material. The dielectric material 36 can be deposited in the cavity 24 at the bottom shell 16, such as, for example, by injecting a predetermined volume of the dielectric material 36 in the cavity 24.

Next, with reference to FIG. 7, the subassembly 22 and the bottom shell 16 are assembled. Before the dielectric material 36 has cured, the subassembly 22 is inserted into the cavity 24 of the bottom shell 16. As the distal end 56 of the subassembly FIG. 2 nears the bottom of the cavity 24, it becomes immersed in the dielectric material 36. The dielectric material 36 flows over, around and between the temperature responsive element 30 and leads 32 to coat those components of the terminal subassembly 12, as shown in FIG. 7. As insertion of the subassembly 22 continues, the cylinder portion 23 passes through the second aperture 51 and is received and guided by the inner surface 45. Insertion continues until the shoulder 44 of the top connector 18 abuts the ledge portion 52 the bottom shell 16. In addition, in this condition the outer wall 42 of the top connector 18 fits snugly within the aperture 50 of the bottom shell 16. As assembled, the features of the top connector 18 and bottom shell 16 position the temperature responsive element 30 in the cavity 24 of the bottom shell 16 at a location that is a substantially equal distance from the inner walls 53 of the cavity 24 (as measured about the perimeter of the cavity 24 in a plane generally perpendicular to the plane shown in FIG. 7). The dielectric material 36 substantially fills the space between the temperature responsive element 30 and the inner walls 53 of the cavity 24.

The dielectric material 36 then cures and hardens. After the dielectric material 36 cures, it forms an electrically insulating but thermally conductive coating over a portion of the terminal subassembly 12, including the thermistor 30 and the leads 32. In addition, the dielectric material 36 aids in affixing together the separate components of the temperature sensor 10 and provides a barrier to moisture.

As described, the construction of the temperature sensor 10 provides by two layers of dielectric insulation over the temperature responsive element 30 and the leads 32. With its two layer insulation configuration, the thermal time constant of the temperature sensor of the present disclosure is enhanced. A primary insulation layer is provided by the dielectric material (e.g., a plastic material) forming the bottom shell 16 of the temperature sensor 10. The bottom shell 16 preferably has a constant wall thickness of 1.0 mm at and around the location the bottom part of the bottom shell 16 where the temperature responsive element 30 and the leads 32 are disposed.

A secondary insulation layer is provided by the dielectric material 36 serving as an electrically insulating, thermally conductive coating over at least portions of the terminal subassembly 12. When assembled to form the temperature sensor 10, the construction and dimensions of the plastic bottom shell 16, the top connector 18, and the properties of the dielectric material 36, enable consistent positioning of, and protection for, the terminal subassembly 12, and particularly the temperature responsive element 30, within the temperature sensor 10. Thus, the temperature sensor 10 is suitable for manufacture in a high-volume production environment while still obtaining a repeatable consistency in temperature sensing performance.

A temperature sensor 10 constructed according to the present disclosure has passed a 3,750 VAC dielectric test and met IEC 60335-1 safety of electrical household appliances standard Class II dielectric requirements.

In another aspect of the temperature sensor 10 of the present disclosure, the temperature sensor 10 includes an overvoltage safety feature that provides a consistent failure mode when an excess voltage is experience by the temperature sensor 10. In particular, a blow-hole safety feature is provided at the distal end 54 of the extension portion 20 of the top connector 18.

In this regard, the distal end 54 of the extension portion 20 has a thin-walled construction as shown in FIG. 7. The proximal end 58 of the extension portion 20, opposite to the temperature responsive element 30, has an opening 60 to the ambient environment. As such, the extension portion 20 is generally a hollow cylinder, closed at one end and open at the other end. Also, as described above, the temperature responsive element 30 of the terminal subassembly 12 abuts directly against the closed, thin-walled, distal end 54 of the extension portion 20 in the assembled temperature sensor 10 and is otherwise surrounded by the hardened dielectric material 36. If the temperature sensor 10 is inadvertently subjected to a high voltage, any catastrophic failure of the temperature responsive element 30 will cause the thin wall of the distal end 54 of the extension portion 20 to rupture and fail, since it is the weakest feature around the temperature responsive element 30. Once ruptured at its distal end 54, the extension portion 20 provides a venting path to the ambient environment through the opening 60 in the proximal end 58.

Consequently, the temperature sensor 10 provides an overvoltage safety feature in a moisture proof package, thereby enabling the temperature sensor to be used in applications such as washing machines.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A temperature sensor comprising:
   a top connector made from a dielectric material and including a connector portion having an outer wall with a shoulder, and a hollow extension portion extending from the connector portion and comprising a proximal end open to an ambient environment and a distal end closed by a thin wall;
   a bottom shell portion made from a dielectric material and including an upper surface having an aperture leading to a cavity and a ledge adjacent to the aperture and cavity;
   a temperature responsive element attached to the top connector disposed in the cavity and abutting the distal end of the extension portion; and
   a curable dielectric material disposed in the cavity and surrounding the temperature responsive element.

2. The temperature sensor of claim 1, further comprising:
   first and second leads located on opposite sides of the temperature responsive element that are connected, respectively, to first and second terminals;
   the first and second terminals being received, respectively, in first and second slots in the top connector located adjacent to the extension portion; and
   wherein the temperature responsive element is a temperature sensitive resistor.

3. The temperature sensor of claim 1, wherein at least a portion of the wall thickness of the bottom shell is substantially 1 mm.

4. The temperature sensor of claim 1, wherein the curable dielectric material is an epoxy having additives that increase a thermal conductivity of the epoxy.

5. The temperature sensor of claim 1, wherein the distal end of the extension portion is operable to rupture upon a catastrophic failure of the temperature responsive element.

6. The temperature sensor of claim 1, wherein the top connector and the bottom shell portion comprise a molded plastic.

7. The temperature sensor of claim 6, wherein the plastic is polypropylene.

8. The temperature sensor of claim 1, wherein the temperature responsive element is substantially centered in the cavity.

9. The temperature sensor of claim 8, wherein the curable dielectric material substantially fills the space between the temperature responsive element and an inner wall of the cavity.

10. A temperature sensor comprising:
    a housing comprising a top connector and a bottom shell, each extending along a longitudinal axis;
    the top connector comprising a terminal connector portion, an extension portion, a cylindrical portion and a shoulder;
    the terminal connector portion being located at an upper end of the top connector;
    the extension portion projecting from a lower end of the terminal connector portion along the longitudinal axis and having a proximal end to a distal end, the proximal end being closest to the upper end and the distal end being furthest from the upper end, the extension portion comprising a hollow post closed at the distal end and open at the proximal end;
    the cylindrical portion located adjacent to the terminal connector portion;
    the shoulder being formed by an outer wall of the terminal connector portion and the cylindrical portion;
    the bottom shell comprising a surface at an upper end of the bottom shell, a first aperture in the surface, a ledge adjacent to the first aperture on a side opposite the surface, and a second aperture adjacent to the ledge, and an interior cavity at a lower end of the bottom shell, the bottom shell having a generally uniform, thin-walled structure at the lower end of the bottom shell;
    a terminal assembly comprising a temperature responsive element disposed within the cavity and a plurality of terminals received in respective slots located at the lower end of the in the terminal connector portion; and
    a curable dielectric material disposed in the cavity and surrounding the temperature responsive element;
    wherein the shoulder of the top connector is positioned to abut the ledge of the bottom shell;
    wherein the temperature responsive element is positioned to abut the distal end of the extension portion.

11. The temperature sensor of claim 10 wherein the distal end of the extension portion is operable to rupture in the event of a catastrophic failure of the temperature responsive element.

12. The temperature sensor of claim 10 wherein the bottom shell further comprises an inner surface adjacent to the cylindrical portion of the top connector.

13. The temperature sensor of claim 10 wherein the slots are located adjacent to the extension portion; and
    wherein the terminals pass through an open end of the cylindrical portion and are received in respective ones of the slots.

14. The temperature sensor of claim 10 wherein the distal end of the extension portion conforms to the shape of the temperature responsive element.

15. A temperature sensor comprising:
a housing comprising a top connector and a bottom shell, the bottom shell comprising a cavity having inner walls;
a terminal subassembly comprising a temperature responsive element and a pair of current conducting terminals electrically connected to the temperature responsive element by current conducting leads located on opposite sides of the temperature responsive element;
wherein the top connector and terminal subassembly comprise means for locating the temperature responsive element relative to the top connector; and
wherein the top connector and the bottom shell comprise means for locating the top connector relative to the bottom shell so that the temperature responsive element is located in the cavity a substantially equal distance from the inner walls of the cavity.

16. The temperature sensor of claim 15 wherein the top connector comprises an extension portion having a distal end that conforms to a shape of the temperature responsive element and abuts the temperature responsive element and is operable to rupture in the event of a catastrophic failure of the temperature responsive element to provide a venting path to the ambient environment through the extension portion.

* * * * *